(12) United States Patent
Matsuura et al.

(10) Patent No.: US 10,598,774 B2
(45) Date of Patent: Mar. 24, 2020

(54) OBJECT DETECTION APPARATUS

(71) Applicant: DENSO CORPORATION, Kariya, Aichi-pref. (JP)

(72) Inventors: Mitsuyasu Matsuura, Nisshin (JP); Taketo Harada, Nisshin (JP); Tetsuya Aoyama, Kariya (JP); Yu Koyama, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/085,208

(22) PCT Filed: Feb. 22, 2017

(86) PCT No.: PCT/JP2017/006661
§ 371 (c)(1),
(2) Date: Sep. 14, 2018

(87) PCT Pub. No.: WO2017/159257
PCT Pub. Date: Sep. 21, 2017

(65) Prior Publication Data
US 2019/0107611 A1 Apr. 11, 2019

(30) Foreign Application Priority Data
Mar. 18, 2016 (JP) ................. 2016-055826

(51) Int. Cl.
*G01S 7/521* (2006.01)
*G01S 15/93* (2020.01)
*G01S 7/526* (2006.01)
*G01S 7/524* (2006.01)
*G01S 15/04* (2006.01)

(52) U.S. Cl.
CPC .............. *G01S 7/521* (2013.01); *G01S 7/524* (2013.01); *G01S 7/526* (2013.01); *G01S 15/04* (2013.01); *G01S 15/93* (2013.01)

(58) Field of Classification Search
CPC .......... G01S 15/04; G01S 15/93; G01S 7/521; G01S 7/524; G01S 7/526
See application file for complete search history.

(56) References Cited

U.S. PATENT DOCUMENTS

2004/0226378 A1 11/2004 Oda et al.
2006/0215492 A1* 9/2006 Campbell ............... G01S 7/524
367/99
2012/0204673 A1* 8/2012 Cizeron ................ B62M 3/086
74/594.4

(Continued)

FOREIGN PATENT DOCUMENTS

JP S59-17181 A 1/1984
JP S61-23984 A 2/1986
JP 2014-035323 A 2/2014

*Primary Examiner* — Nader Bolourchi
(74) *Attorney, Agent, or Firm* — Knobbe, Martens, Olson & Bear, LLP

(57) ABSTRACT

An object detection apparatus drives a piezoelectric vibrator to transmit an ultrasonic wave, and receives a reflected wave that is reflected from an object. The object detection apparatus includes the piezoelectric vibrator, a drive circuit that supplies drive power which drives the piezoelectric vibrator, and a resistor section that is connected in parallel with the piezoelectric vibrator and has a resistance value that is variable.

12 Claims, 5 Drawing Sheets

(56) References Cited

U.S. PATENT DOCUMENTS

2013/0083362 A1* 4/2013 Tanaka ............... H04N 1/00244
358/1.16
2013/0108017 A1* 5/2013 Golubovic ............ G06T 7/0008
378/41
2014/0043940 A1 2/2014 Niwa

* cited by examiner

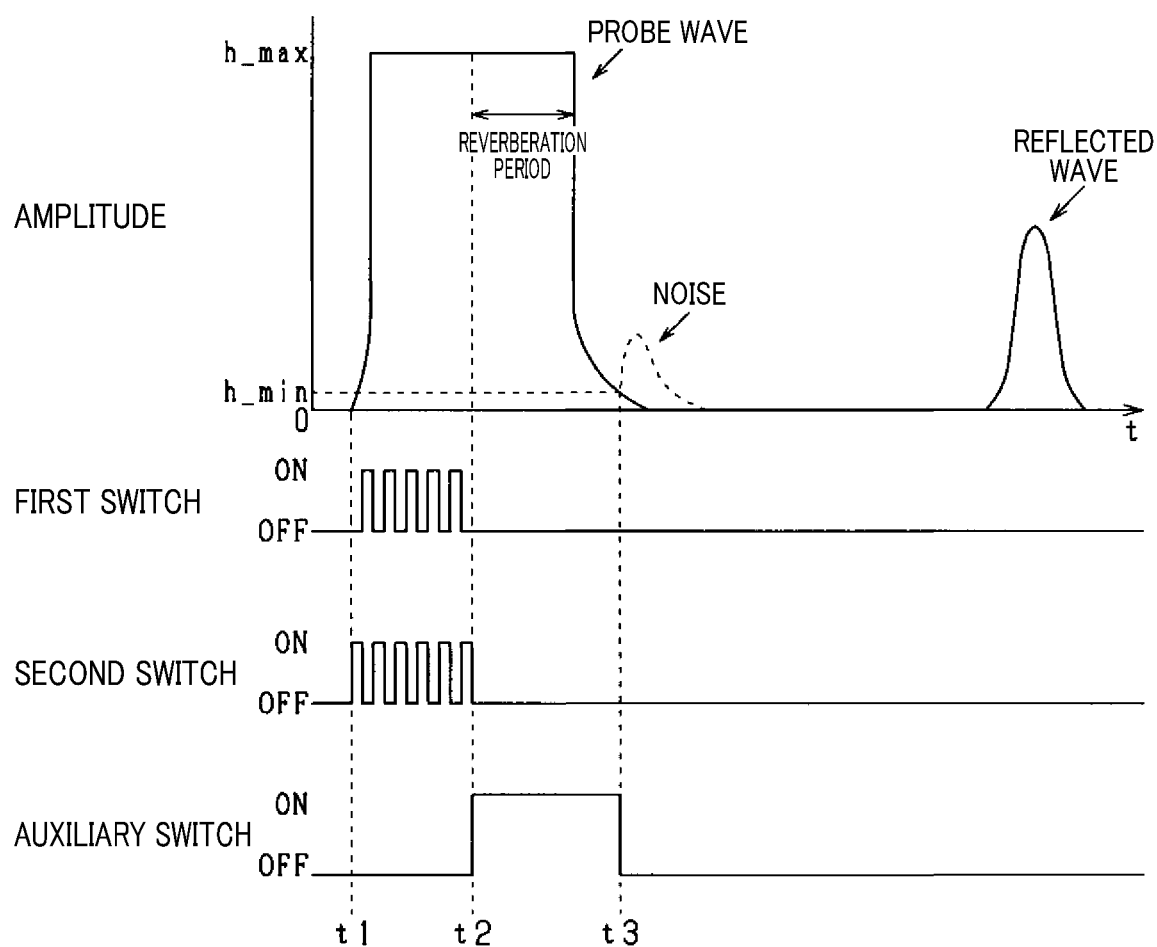

OBJECT DETECTION APPARATUS

CROSS-REFERENCE TO RELATED APPLICATIONS

The present application is a national stage application under 35 U.S.C. § 371(c) of PCT Application No. PCT/JP2017/006661, filed on Feb. 22, 2017, which is based on Japanese Patent Application No. 2016-055826 filed on Mar. 18, 2016, the description of which is incorporated herein by reference.

TECHNICAL FIELD

The present disclosure relates to an object detection apparatus that transmits probe waves and receives reflected waves that are reflected from objects.

BACKGROUND ART

With an object detection apparatus which transmits probe waves, receives reflected waves that are reflected from an object, and detects the distance to the object, reverberation is produced when the probe waves are transmitted. The energy of the reverberation is typically significantly greater than the energy of the reflected waves, so that even if the reflected waves are received during a period (reverberation period) in which the reverberation is produced, it is difficult to detect the reflected waves.

An ultrasonic sensor is described in PTL 1, as a sensor which shortens the reverberation period. With the ultrasonic sensor described in PTL 1, after a piezoelectric vibrator is driven, a pulse signal that is of inverse phase to the reverberation is transmitted, and the reverberation is suppressed by the pulse signal.

CITATION LIST

Patent Literature

[PTL 1] Japanese Patent Publication No. 2014-35323

SUMMARY OF THE INVENTION

With the ultrasonic sensor of PTL 1, if there is a deviation of the timing at which the inverse phase pulse signal is outputted, this may cause an increase in the amplitude of the reverberation. Furthermore, if the pulse signal has an amplitude that is greater than necessary, then although the reverberation can be suppressed, the piezoelectric vibrator will be driven by the pulse signal. That is, it is necessary for the pulse signal to be accurately generated, and this signifies that it is difficult to ensure robustness.

The present disclosure is intended to overcome the above problem, and has a main objective of providing an object detection apparatus that can improve performance in detecting objects.

The present disclosure is an ultrasonic sensor that drives a piezoelectric vibrator to transmit an ultrasonic wave and receives a reflected wave that is reflected from an object, and that includes the piezoelectric vibrator, a drive circuit that supplies drive power for driving the piezoelectric vibrator, and a resistor section that is connected in parallel with the piezoelectric vibrator and has a resistance value that is variable.

With the above configuration, if it is required to reduce reverberation after the piezoelectric vibrator is driven when transmitting a probe wave, the resistance value of a resistor section that is connected in parallel with the piezoelectric vibrator is lowered, thereby enabling the electrical power of the reverberation to be consumed by the resistor section. In this way, the duration for which the reverberation is produced can be shortened, and it becomes possible to detect a reflected wave from a nearby object. On the other hand, at the time when the reflected wave is received, etc., by increasing the resistance value of the resistor section that is connected in parallel with the piezoelectric vibrator, electrical power that is consumed by the resistor section can be reduced. In that way, reception sensitivity can be ensured for a reflected wave that is reflected from a distant object, and a reflected wave that is reflected from an object having low reflectance, etc. Hence, both the detection performance for nearby objects and the detection performance for distant objects can be ensured.

BRIEF DESCRIPTION OF THE DRAWINGS

The above and other objects, features and advantages of the present disclosure will be made clearer from the following detailed description, referring to the appended drawings. The drawings are:

FIG. 8 is a timing diagram of processing executed by a control section of the seventh embodiment.

DESCRIPTION OF EMBODIMENTS

Figure 1:
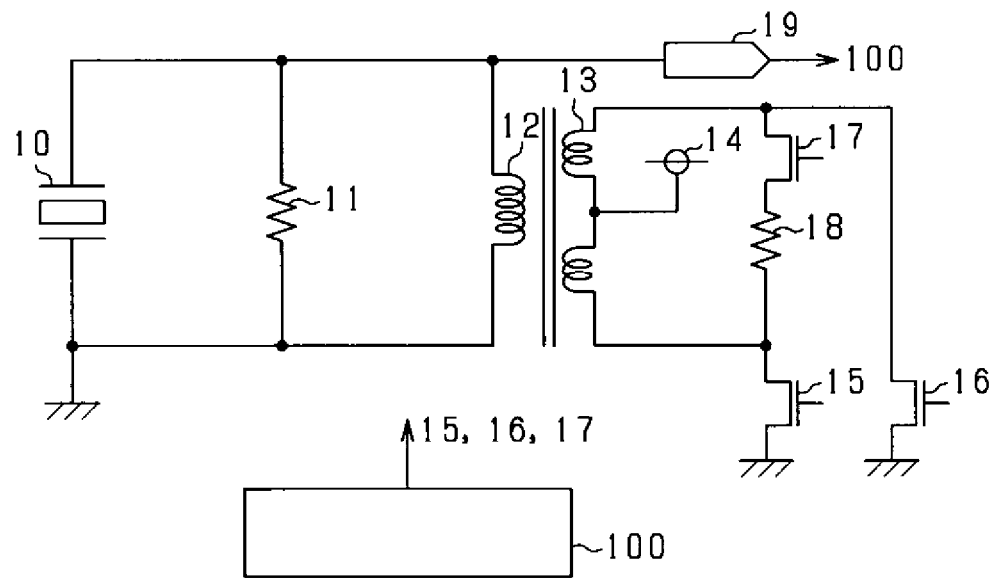
FIG. 1 is a diagram illustrating a configuration of an ultrasonic sensor according to a first embodiment.

Hereinafter, embodiments are described with reference to the drawings. It should be noted that in the following embodiments, elements that are mutually identical or are mutually equivalent between the embodiments are indicated by the same reference signs in the drawings and are described using the same designations for the elements.

First Embodiment

An object detection apparatus according to the present embodiment is an ultrasonic sensor and is installed in a mobile body such as a vehicle. The ultrasonic sensor transmits ultrasonic waves to the surroundings of the mobile body, receives reflected waves that are reflected from an object in the surroundings of the mobile body, and obtains the distance between the mobile body and the object by measuring the time interval between the transmission and the reception.

FIG. 1 is a circuit diagram of the ultrasonic sensor according to the present embodiment. With this ultrasonic sensor, ultrasonic waves are transmitted by applying voltage to a piezoelectric vibrator 10, and the energy of reflected waves received by the piezoelectric vibrator 10 is converted to voltage. A first resistor 11 and a first coil 12 are connected in parallel with the piezoelectric vibrator 10. The first coil 12 is magnetically coupled to the second coil 13, thereby forming a transformer. The second coil 13 includes a center tap, to which a power source 14 is connected. The voltage of the power source 14 is, for example, 12 V.

A first end of the second coil 13 is connected to the ground via a first switch 15 while a second end of the second coil 13 is connected to the ground via a second switch 16. The second coil 13, the first switch 15, and the second switch 16 constitute a drive circuit of the piezoelectric vibrator 10. In addition, the first end and the second end of the second coil 13 are connected by a series-connected body consisting of a third switch 17 and a second resistor 18.

The voltage at the first coil 12 side is inputted via an amplifier 19 to the control section 100, which transmits control signals to the first switch 15, the second switch 16 and the third switch 17. The control section 100 is a computer that includes a CPU, a ROM, a RAM, an I/O, and the like.

The control section 100 transmits probe waves, and performs control with the time period from the time of the transmission until a predetermined interval has elapsed as one control period. When ultrasonic waves are transmitted by driving the piezoelectric vibrator 10, the control section 100 performs drive control for supplying driving power by alternately turning on the first switch 15 and the second switch 16. In that way, forward direction and reverse direction voltages are alternately applied to the piezoelectric vibrator 10. When reflected waves are received by the piezoelectric vibrator 10, both of the first switch 15 and the second switch 16 are turned off. In this way, power is not supplied from the second coil 13 side to the first coil 12 side, and the piezoelectric vibrator 10 vibrates by receiving the reflected waves. A voltage based on the power that is produced by that vibration is inputted via the amplifier 19 to the control section 100, to thereby detect that reflected waves are received.

If reflected waves are received, the control section 100 calculates the distance to the object based on the time period from the time point at which the probe waves are transmitted until the reflected waves are received, and transmits information on the distance to other control units. If no reflected waves are received in a time period from the time point of transmitting the probe waves until a predetermined interval has elapsed, then this is taken to signify that there is no object in the detection area. It should be noted that it would be equally possible to obtain the time period that elapses until reflected waves are received by the control section 100, and to transmit information on the time period to other control units.

In addition to controlling opening and closing of the first switch 15 and the second switch 16, the control section 100 controls opening and closing of the third switch 17. When the first switch 15 and the second switch 16 are turned off and the third switch 17 is turned on, the ends of the second cod 13 become connected via the second resistor 18. Hence, if there is current flowing at the first coil 12 side, current will flow at the second coil 13 side, and power will be consumed in the second resistor 18 in addition to the first resistor 11. At this time, a circuit is obtained which is equivalent to a circuit in which a resistor having a resistance value obtained by multiplying the resistance value of the second resistor 18 by the square of a turn ratio is connected in parallel with the first resistor 11. That is, if the resistance value of the second resistor 18 is 500Ω and the turn ratio between the first coil 12 and the second coil 13 is 4:1, then when the third switch 17 is turned on, a circuit is obtained which is equivalent to a circuit in which the first resistor 11 is connected in parallel with a resistor having a resistance value of 8 kΩ.

Hence, by turning on the third switch 17 during a time period (reverberation period) in which reverberation is produced after the piezoelectric vibrator 10 is controlled to be driven, then due to the first resistor 11, the first coil 12, the second coil 13, and the second resistor 18, a resistor section is formed which has a lower combined resistance value than for the case in which only the first resistor 11 is connected in parallel, thereby increasing the amount of power of the reverberation that is consumed per unit of time, so that the reverberation period can be shortened. On the other hand, when the combined resistance value is small, if reflected waves having low amplitudes are received, then the electrical power based on the reflected waves will be consumed by the resistors, so that detection will become difficult. Hence, when the reverberation of the piezoelectric vibrator 10 ends, control is performed for turning off the third switch 17, thereby making the resistance value of the resistor section connected in parallel with the piezoelectric vibrator 10 large.

Figure 2:
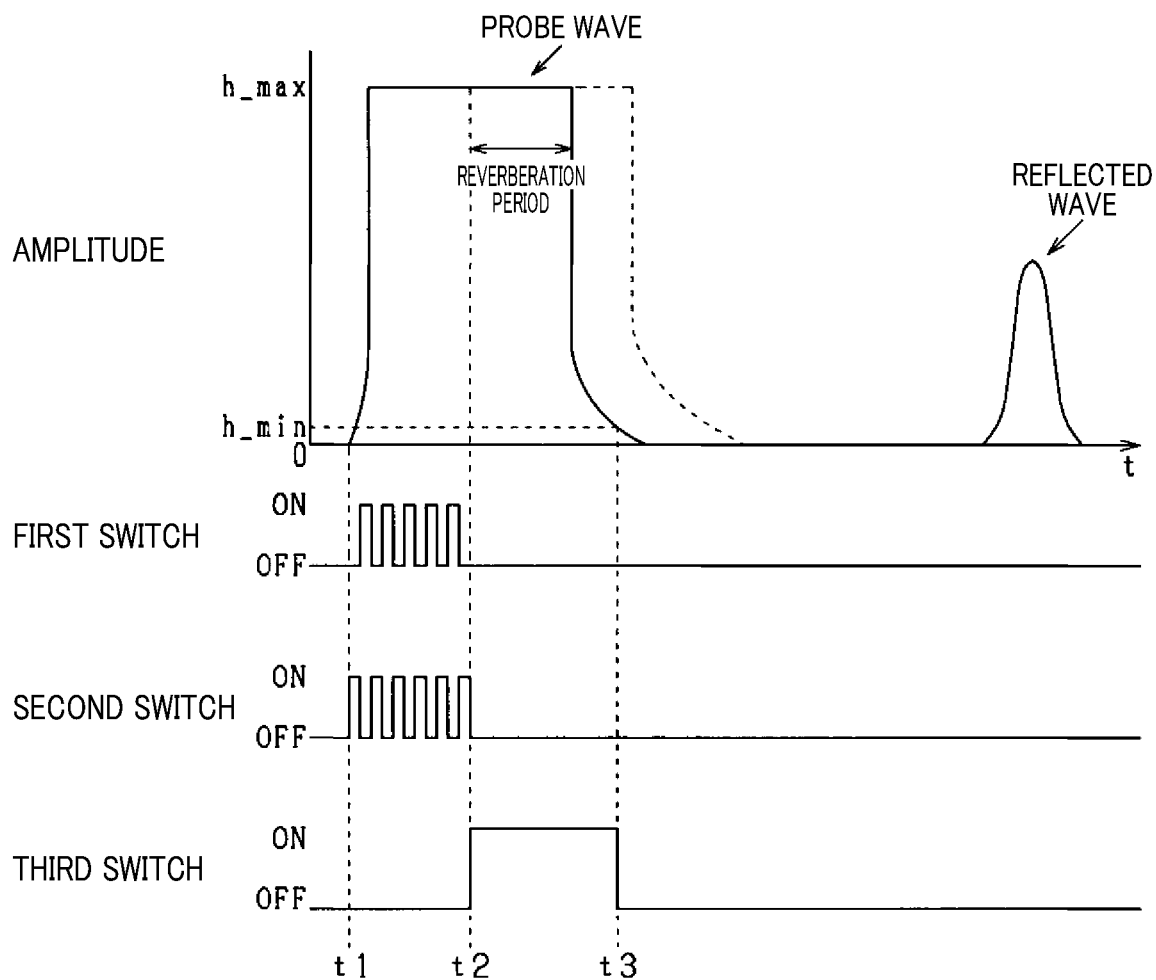
FIG. 2 is a timing diagram of processing executed by a control section of the first embodiment.

Next, a timing diagram of the processing executed by the control section 100 will be described referring to FIG. 2. First, when a start command for driving the piezoelectric vibrator 10 is issued at time point t1, drive control of the piezoelectric vibrator 10 is performed for supplying drive power by alternately turning on the first switch 15 and the second switch 16. Due to this drive control, voltages having different polarities are alternately applied to the piezoelectric vibrator 10, thereby driving the piezoelectric vibrator 10 to transmit probe waves that are ultrasonic waves. At that time, the amplitude of the probe waves takes a value larger than h_max, which is the limit value that can be detected. The time period in which the drive control is performed is predetermined, and continues until time point t2.

At time point t2, both of the first switch 15 and the second switch 16 are turned off, and the drive control of the piezoelectric vibrator 10 ends. Since reverberation has been produced in the piezoelectric vibrator 10 at this time, the third switch 17 is turned on to shorten the reverberation period. As a result of turning on the third switch 17, a closed circuit in which the second coil 13 and second resistor 18 are connected in series is formed. As a result, the first resistor 11 and the second resistor 18 become parallel-connected, and the combined resistance value becomes small. The amount of electrical power that is consumed by the first resistor 11 and the second resistor 18 thereby increases, and the reverberation period can be shortened. It should be noted that in FIG. 2, the waveform of the probe waves for the case in which the control of the third switch 17 is not executed is indicated by dashed lines.

If the control of turning on the third switch 17 is continued and the amplitude of the reverberation at time point t3 is less than the threshold value h_min, then since the amplitude is sufficiently small for enabling detection of reflected waves, the third switch 17 is then turned off. In that way, since the first resistor 11 that is connected in parallel with the piezoelectric vibrator 10 is no longer connected in parallel with the second resistor 18, the resistance value becomes high. As a result, when reflected waves are received by the piezoelectric vibrator 10 while in standby to receive reflected waves, the electrical power that is consumed by the resistor becomes small. Hence, reflected waves having a small amplitude such as reflected waves that are reflected from a distant object, or reflected waves reflected from an object having a low reflectance, can be detected.

Due to the above configuration, the ultrasonic sensor according to the present embodiment provides the following effects.

After ending the drive control of the piezoelectric vibrator 10, by turning on the third switch 17, the electrical power of the reverberation can be more readily consumed, and the reverberation period can be shortened. Since reflected waves from objects cannot be detected during the reverberation period, by shortening the reverberation period, it becomes possible to detect objects that are nearby.

After the reverberation period ends, the third switch 17 is turned on, and the value resistance of the resistor that is connected in parallel with the piezoelectric vibrator 10 is increased. As a result, reception sensitivity can be ensured for reflected waves having low amplitude, such as reflected waves that are reflected from distant objects, and reflected waves that are reflected from objects having low reflectance.

Since the piezoelectric vibrator 10 vibrates by applying a high voltage, if a switch is connected in series with a resistor that is connected in parallel with the piezoelectric vibrator 10, it is necessary for the switch to have a high value of withstanding voltage. However, with the present embodiment, by providing the series-connected body of the third switch 17 and the second resistor 18 in a low-voltage drive circuit, the combined value of resistance that is connected in parallel with the piezoelectric vibrator 10 can be made small by turning on the third switch 17. As a result, it becomes possible to use a switch having a low value of withstanding voltage as the third switch 17.

After the drive control is applied, the drive circuit of the piezoelectric vibrator 10 enters a standby condition, thereby waiting until the next drive control starts, and in general it is not utilized. With the present embodiment, the first coil 12 and the second coil 13 constituting the drive circuit of the piezoelectric vibrator 10 are used to constitute the resistor section which shortens the reverberation period, and hence it is not necessary to provide a separate resistor section. Thus, the size of the circuitry and the manufacturing costs can be reduced.

Second Embodiment

Figure 3:
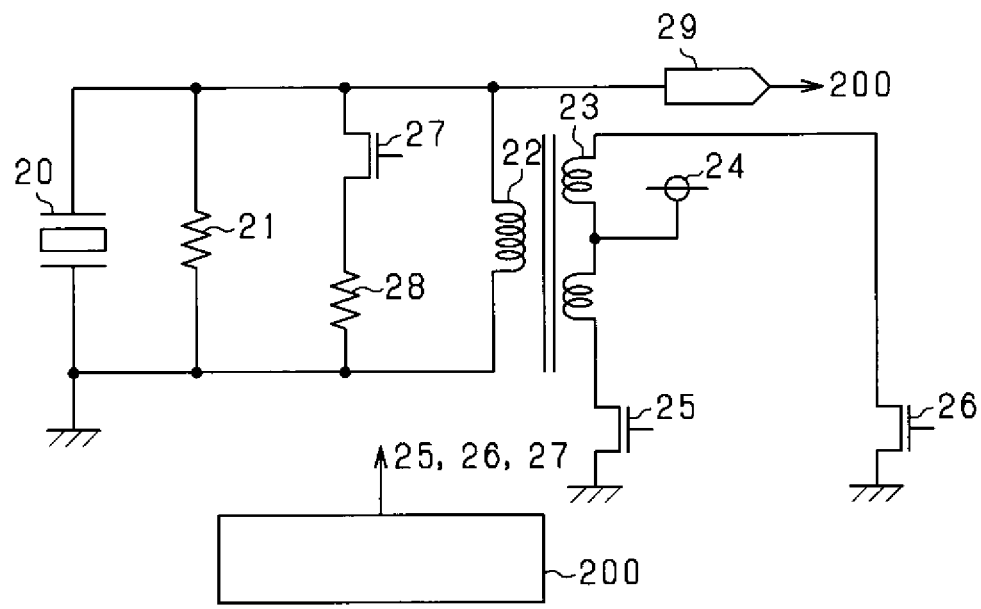
FIG. 3 is a diagram illustrating a configuration of an ultrasonic sensor according to a second embodiment.

The ultrasonic sensor of the present embodiment differs from the ultrasonic sensor according to the first embodiment in part of the circuit configuration. FIG. 3 is a circuit diagram of the ultrasonic sensor according to the present embodiment.

A first resistor 21 and a first coil 22 are connected in parallel with a piezoelectric vibrator 20. The first coil 22 is magnetically coupled to a second coil 23, thereby forming a transformer. The second coil 23 includes a center tap, to which a power source 24 is connected. A first end of the second coil 23 is connected to the ground via a first switch 25 and a second end of the second coil 23 is connected to the ground via a second switch 26.

Furthermore, a series-connected body consisting of a third switch 27 and a second resistor 28 is connected in parallel with the piezoelectric vibrator 20. That is, a resistor section is formed by the first resistor 21, the second resistor 28, and the third switch 27. Hence, when the third switch 27 is turned on, a parallel-connected body consisting of the first resistor 21 and the second resistor 28 is connected in parallel with the piezoelectric vibrator 20, and the combined resistance of these is less than for the case in which only the first resistor 21 is connected in parallel with the piezoelectric vibrator 20. That is, when the third switch 27 is turned on, the same effect is obtained as when the third switch 17 is turned on in the first embodiment.

In the same way as in the first embodiment, the voltage of the first coil 22 side is inputted to the control section 200 via the amplifier 29, and the control section 200 transmits control signals to the first switch 25, the second switch 26, and the third switch 27. Since the control of the first to third switches 25 to 27 that is performed by the control section 200 is equivalent to that in the first embodiment, the description is omitted.

Third Embodiment

With this embodiment, the circuit configuration is similar to that in the second embodiment, but the embodiment differs in part of the processing performed by the control section 200. With the present embodiment, there is a long-distance mode (first mode) in which the reverberation period is allowed to become long, and in which the detection performance for reflected waves that are reflected from distant objects is enhanced, and a short-distance mode (second mode) in which the reverberation period is shortened and in which reflected waves from nearby objects can also be detected. Each of the long-distance mode and the short-distance mode has a single control opportunity during a predetermined time interval that starts from the time of transmitting the probe waves. For example, after one control opportunity has ended, a judgment is made as to whether or not to switch over to the long-distance mode or the short-distance mode.

In the long-distance mode, the third switch 27 is held in an off state, so that the resistance value of the resistor which is connected in parallel with the piezoelectric vibrator 20 becomes high. As a result, the amount of electrical power consumed by the resistor becomes small and the reverberation period becomes long. On the other hand, the electrical power of reflected waves that are reflected from distant objects will not readily be attenuated, so that the detection performance for the reflected waves can be enhanced.

In the short-distance mode, the third switch 27 is held in an on state, so that the resistance value of the resistor which is connected in parallel with the piezoelectric vibrator 20 becomes small. As a result, the amount of electrical power consumed by the resistor per unit of time increases, and the reverberation period becomes short. Hence, reflected waves that are reflected from objects which are nearby can be detected.

First, the control section 200 continues detection of objects in the long-distance mode, to maintain the detection performance for distant objects. If reflected waves from a distant object continue to be detected, and the object becomes closer to the ultrasonic sensor, then if the distance to the object becomes less than a predetermined value (for example, 1 m), changeover to the short-distance mode is performed, thereby shortening the reverberation period. By means of such control, good detection performance can be maintained for both nearby objects and distant objects.

Fourth Embodiment

With the present embodiment, the circuit configuration is similar to that of the second embodiment, but part of the processing performed by the control section 200 is different. In addition, the 200 performs control in the long-distance mode and the short-distance mode as in the third embodiment.

First, the control section 200 performs transmitting of probe waves and receiving of reflected waves by control in one of the long-distance mode and short-distance mode. In the next control period, transmitting of probe waves and receiving of reflected waves are performed by control in the other one of the long-distance mode and short-distance mode. Hence, if there is an object (object positioned at a short distance) that is difficult to detect by the control in the long-distance mode, the position of the object can be detected when the control in the short-distance mode is next performed. On the other hand, if there is an object (object positioned at a long distance) that is difficult to detect by the control in the short-distance mode, the position of the object can be detected when control is next performed in which the combined resistance is made large. By means of such control, good detection performance can be achieved both for nearby objects and distant objects.

It should be noted that it would be equally possible to perform the control in the short-distance mode a plurality of times after having performed the control in the long-distance mode a plurality of times. Furthermore, it would be equally possible to perform the control in the short-distance mode a plurality of times after having executed control in the long-distance mode a single time.

Fifth Embodiment

Figure 4:
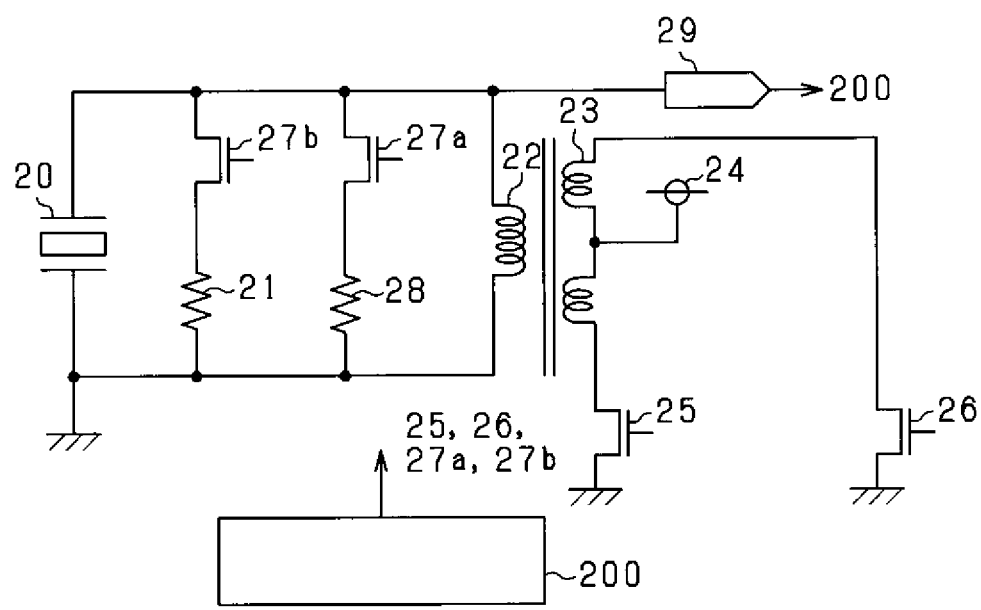
FIG. 4 is a diagram illustrating a configuration of an ultrasonic sensor according to a fifth embodiment.

With the present embodiment, part of the circuit of the ultrasonic sensor differs from that of the second embodiment. FIG. 4 is a circuit diagram of the ultrasonic sensor of the present embodiment. In the same way as in the second embodiment, a third switch 27*a* is connected in series with the second resistor 28 that is connected in parallel with the piezoelectric vibrator 20. Furthermore, a fourth switch 27*b* is connected in series with the first resistor 21 that is connected in parallel with the piezoelectric vibrator 20. With such a circuit, it is possible to select a condition in which only the first resistor 21 is connected in parallel with the piezoelectric vibrator 20, a condition in which only the second resistor 28 is connected in parallel with the piezoelectric vibrator 20, and a condition in which both the first resistor 21 and the second resistor 28 are connected in parallel with the piezoelectric vibrator 20, i.e. three conditions can be selected. Since the remaining configuration is similar to that in the second embodiment, the description is omitted.

It is assumed here that the resistance value of the first resistor 21 is greater than the resistance value of the second resistor 28. That is, when both the third switch 27*a* and the fourth switch 27*b* are turned on, the resistance value of the resistor connected in parallel with the piezoelectric vibrator 20 becomes the minimum, while when the third switch 27*a* is turned off and the fourth switch 27*b* is turned on, the resistance value of the resistor connected in parallel with the piezoelectric vibrator 20 becomes the maximum.

Figure 5:
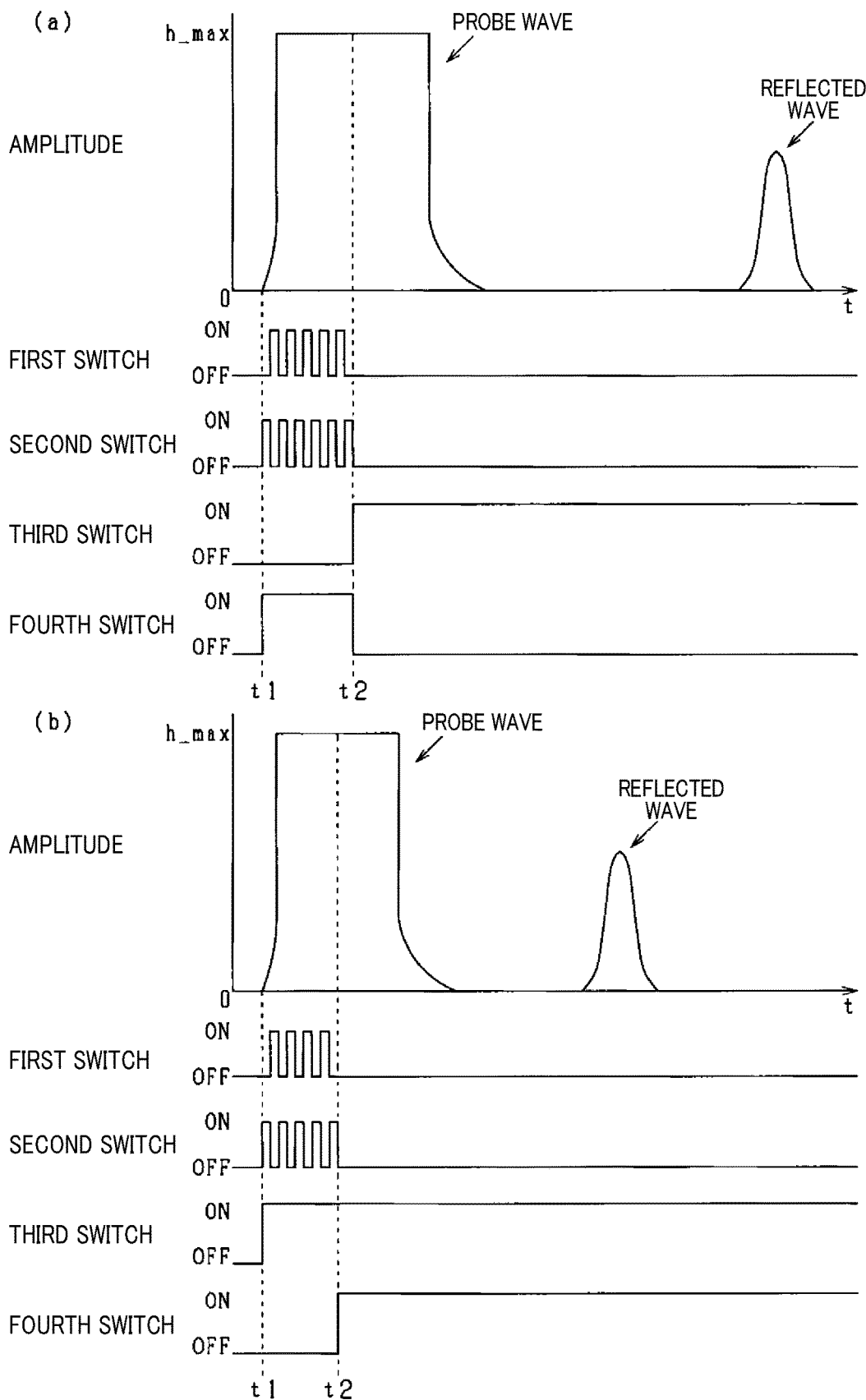
FIG. 5(a) is a timing diagram in a long-distance mode.
FIG. 5(b) is a timing diagram in a short-distance mode.

FIG. 5(*a*) is a timing diagram of the long-distance mode performed by the ultrasonic sensor according to the present embodiment, and FIG. 5(*b*) is a timing diagram of the short-distance mode. The manner of distinctively using the long-distance mode and the short-distance mode is equivalent to those in the third and fourth embodiments.

In the long-distance mode, the third switch 27*a* is turned off and the fourth switch 27*b* is turned on while electrical power is being supplied to the piezoelectric vibrator 20, which starts at time point t1. As a result, while electrical power is being supplied, the consumption of electrical power in the resistors can be suppressed. Next, when the supplying of electrical power ends at time point t2, the third switch 27*a* is turned on and the fourth switch 27*b* is turned off. In that way, the resistance value of the resistor that is connected in parallel with the piezoelectric vibrator 20 becomes small, and the reverberation can quickly be reduced.

In the short-distance mode, the third switch 27*a* is turned on and the fourth switch 27*b* is turned off while electrical power is being supplied to the piezoelectric vibrator 20, which starts at time point t1. As a result, while electrical power is being supplied, the consumption of electrical power in resistors can be suppressed. Thereafter, when the supplying of electrical power ends at time point t2, both the third switch 27*a* and the fourth switch 27*b* are turned on. In that way, the resistance value of the resistor that is connected in parallel with the piezoelectric vibrator 20 becomes small, and the reverberation can quickly be reduced. In this case, the time period during which electrical power is supplied to the piezoelectric vibrator 20, that is, the interval between time point t1 and time point t2, is made smaller than that in the long-distance mode. Thereby, the reverberation of the piezoelectric vibrator 20 can be reduced and as a result, the reverberation period can be shortened.

It should be noted that the switching patterns shown in FIGS. 5(*a*) and (*b*) are only examples, and that it would be equally possible to make the resistance value in the long-distance mode greater than the resistance value in the short-distance mode. Furthermore, as with the first and second embodiments, it would be possible to perform control for increasing the resistance value after the reverberation has ends.

Sixth Embodiment

Figure 6:
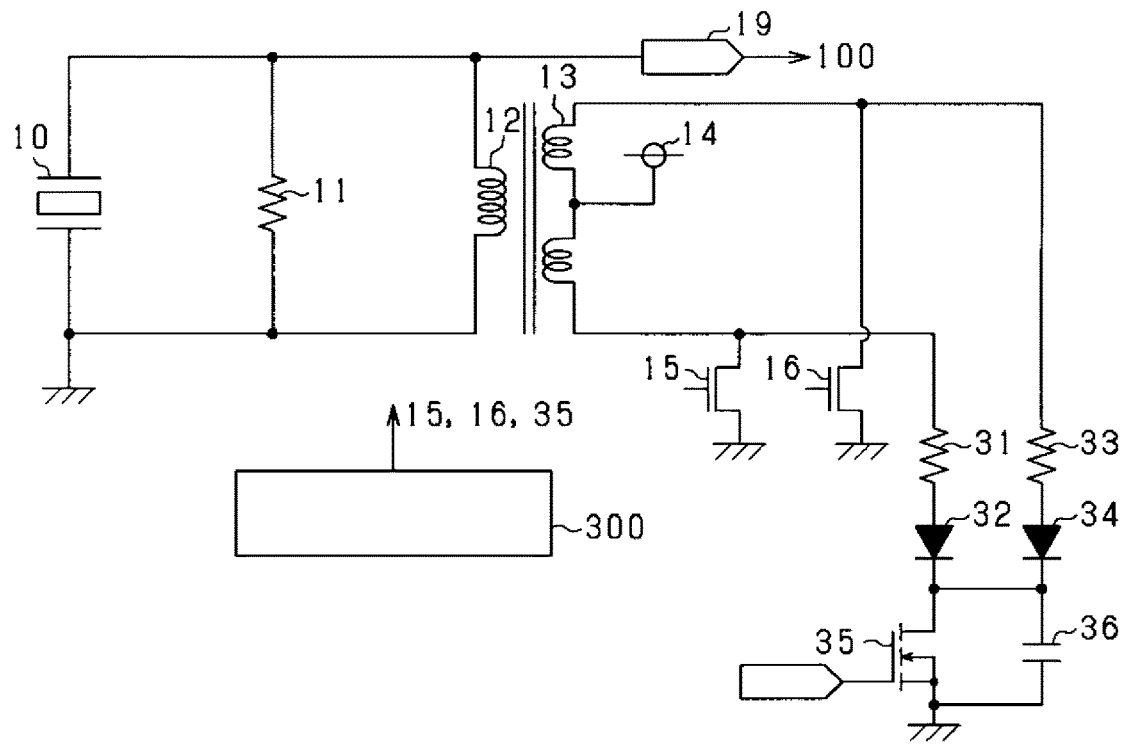
FIG. 6 is a diagram illustrating a configuration of an ultrasonic sensor according to a sixth embodiment.

With the present embodiment, part of the circuit configuration of the ultrasonic sensor differs from the ultrasonic sensors of the above embodiments. FIG. 6 is a circuit diagram of the ultrasonic sensor of the present embodiment.

In the same way as in the first embodiment, the piezoelectric vibrator 10 has a first resistor 11 and a first coil 12 connected in parallel, with the first coil 12 being magnetically coupled to the second coil 13 to form a transformer.

One end of the second coil 13 is connected via the second resistor 31 to the anode of the first diode 32. The other end of the second coil 13 is connected via the third resistor 33 to the anode of the second diode 34. The cathodes of the first and second diodes 32, 34 are connected to the ground via the third switch 35.

The control section 300 transmits control signals to the first switch 15, the second switch 16 and the third switch 35. That is, since the timing of control of the first switch 15, the second switch 16, and the third switch 35 is the same as in the first embodiment, the description is omitted.

Due to the above configuration, an ultrasonic sensor according to the present embodiment provides effects that are equivalent to those of the first embodiment.

Seventh Embodiment

Figure 7:
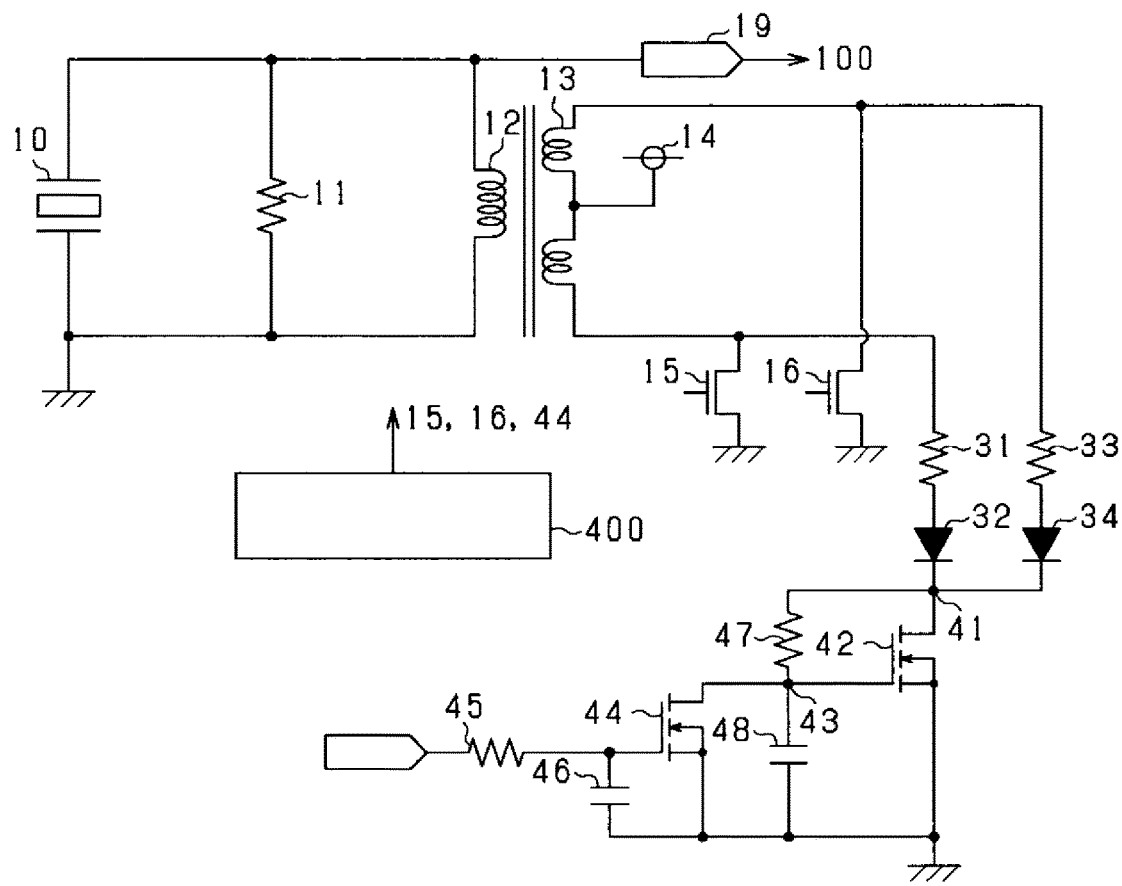
FIG. 7 is a diagram illustrating a configuration of an ultrasonic sensor according to a seventh embodiment.

With the present embodiment, part of the circuit configuration of the ultrasonic sensor differs from the ultrasonic sensors of the above embodiments. FIG. 7 is a circuit diagram of the ultrasonic sensor according to the present embodiment.

The piezoelectric vibrator 10 has a first resistor 11 and a first coil 12 connected in parallel as in the first embodiment, with the first coil 12 being magnetically coupled to the second coil 13 to form a transformer.

One end of the second coil 13 is connected via the second resistor 31 to the anode of the first diode 32. The other end of the second coil 13 is connected via the third resistor 33 to the anode of the second diode 34. The cathodes of the first diode 32 and the second diode 34 are connected to a first connection point 41. The first connection point 41 is connected to the ground via a third switch 42.

The gate, which is a conduction control terminal, of the third switch 42, is connected to the ground via a second connection point 43 and an auxiliary switch 44. The gate of the auxiliary switch 44 is configured to receive control signals via a resistor 45. Furthermore, a capacitor 46 is provided between the gate of the auxiliary switch 44 and the ground part.

The first connection point 41 and the second connection point 43 are connected via a fourth resistor 47, while the second connection point 43 is connected to the ground via a capacitor 48. That is, an RC series-connected circuit is formed by the fourth resistor 47 and the capacitor 48, with that RC series-connected circuit being connected in parallel with the third switch 42.

The control section 400 transmits control signals to the first switch 15, the second switch 16, and the auxiliary switch 44. The timing of control of the first switch 15 and second switch 16 are equivalent to that of the first embodiment. Furthermore, the timing of control of the auxiliary switch 44 is equivalent to the timing of the control of the third switch 17 of the first embodiment.

When the control section 400 turns on the auxiliary switch 44, the gate voltage of the third switch 42 becomes greater than a threshold value, and the third switch 42 is turned on. At that time, the potential difference between the ends of the second coil 13 fluctuates about 0 V as a central value, and since the RC series-connected circuit formed by the fourth resistor 47 and the capacitor 48 is connected in parallel with the third switch 42, the gate voltage of the third switch 42 is held at a value that is greater than the threshold value. As a result, the third switch 42 remains in an on state.

When the control section 400 turns off the auxiliary switch 44, then accompanying this, the third switch 42 is also turned off. At that time, due to the RC series-connected circuit formed by the fourth resistor 47 and the capacitor 48 which is connected in parallel with the third switch 42, the potential difference between the ends of the second coil 13 gradually increases from 0 V. That is, although the voltage change at the second coil 13 side of the transformer is amplified by the first coil 12, since the voltage change is gradual, generation of noise due to sudden voltage variation at the first coil 12 side can be suppressed.

Next, the processing performed by the control section 400 according to the present embodiment will be described referring to the timing diagram shown in FIG. 8. As described above, since the potential difference between the ends of the second coil 13 increases gradually, the generation of noise, as indicated by a dashed line in FIG. 8, can be suppressed.

Due to the above configuration, the ultrasonic sensor according to the present embodiment provides effects that are equivalent to those of the first embodiment, and in addition provides the following effects.

Since the RC series-connected circuit formed by the fourth resistor 47 and the capacitor 48 is connected in parallel with the third switch 42, the change in voltage of the second coil 13 side of the transformer when the third switch 42 is turned off can be made gradual. For that reason, noise that is generated due to sudden changes in voltage can be suppressed. If noise is generated when the third switch 42 is turned off, then the accuracy in reception of the reflected waves would be decreased until that noise attenuates, so that it would be necessary for reception of the reflected waves to wait after the noise has sufficiently attenuated. Hence, a standby interval until reception starts would be lengthened, and it would be difficult to detect nearby objects. However, due to the RC series-connected circuit formed by the fourth resistor 47 and the capacitor 48, the noise that is indicated by the dashed line in FIG. 8 can be suppressed, and the position of a nearby object can also be accurately detected. Hence, the detection range of the ultrasonic sensor can be widened.

MODIFIED EXAMPLES

In the first embodiment, a series-connected body formed of the second resistor 18 and the third switch 17 is provided in the drive circuit, and by using the first coil 12 and the second coil 13 that are employed in driving the piezoelectric vibrator 10, the reverberation period is reduced. However, it would be equally possible to further provide a pair of coils that are different from the first coil 12 and the second coil 13, and to form a resistor section by a series-connected body formed of a resistor and switch, which are connected to one of the pair of coils.

In the first embodiment, a point at which the wave height falls below h_min, which is a threshold, is employed as an opportunity for performing control for turning off the third switch 17. However, it would be equally possible to turn off the third switch 17 after a predetermined time interval has elapsed from the time point t2 at which the supplying of electrical power to the piezoelectric vibrator 10 ends. Although the time interval is predetermined, it would be equally possible to apply correction to the time interval based on conditions such as temperature and humidity.

In the second to fifth embodiments, the combined resistance of resistors that are connected in parallel with the piezoelectric vibrator 20 is altered by connecting the resistors in parallel and changing the form of the connection. However, it would be equally possible to connect a variable resistor in parallel with the piezoelectric vibrator 20, and to alter the resistance value of that variable resistor.

In the above embodiments, a center tap is provided to the primary-side coil of the transformer, that is, the second coil 13. However, it would be equally possible to use a coil not having a center tap. In that case, electrical power could be supplied by using a power supply circuit that alternately applies a forward-direction voltage and a reverse-direction voltage.

In the first embodiment, it would be equally possible to provide a series-connected body formed of a switch and a resistor, in addition to a series-connected body formed of the third switch 17 and the second resistor 18, to vary the combined resistance value in a plurality of steps. Furthermore, it would be equally possible to use a variable resistor as the second resistor 18.

In the second to fifth embodiments, in addition to the first resistor 21 and the second resistor 28, it would be equally possible to connect a resistance in parallel and to provide a switch for performing changeover of the connection condition of that resistor.

It would be equally possible to apply, in the third and fourth embodiments, the control for making the duration of supplying electrical power during the short-distance mode shorter than in the long-distance mode shown in the fifth embodiment.

In the sixth and seventh embodiments, the ends of the second coil 13 are respectively connected with a second resistor 31 and a third resistor 33, and the second resistor 31 and third resistor 33 are connected to the ground via a third switch 35. However, the above embodiments are not limited to a specific configuration in which the ends of the second coil 13 are respectively connected with a resistor and a switch. For example, a configuration may be used in which the ends of the second coil 13 are connected respectively via diodes to a single resistor, which is connected to the ground via a switch. Furthermore, it would be equally possible to provide a switch between the diode and the resistor. That is, a resistor may be provided which is connected between each of the ends of the second coil and the ground via a switch.

In the seventh embodiment, a delay circuit is configured which delays the changeover between the open and closed states of the third switch 42, and which is formed of an auxiliary switch 44, a fourth resistor 47, and a capacitor 48. However, the delay circuit is not limited to having that configuration.

In the above embodiments, the distance to an object is measured by using an ultrasonic sensor. However, it would be equally possible to use the sensor for detecting the presence of objects that are within a predetermined distance.

In the above embodiments, the ultrasonic sensor is installed in a mobile body such as a vehicle. However, it is not limited to such an installation. Installation on a stationary object, etc. for detecting the distances to objects that are in the surroundings of the stationary object would be equally possible.

Although the present disclosure is described based on embodiments, it should be understood that the present disclosure is not limited to the embodiments and configurations thereof. The present disclosure includes various modified examples and modifications within an equivalent scope. Furthermore, various combination and forms, in addition to other combinations and forms which further include fewer or more elements, are also included in the scope and the concept of the present disclosure.

The invention claimed is:

1. An object detection apparatus that drives a piezoelectric vibrator to transmit an ultrasonic wave, and receives a reflected wave that is reflected from an object, the apparatus comprising:
the piezoelectric vibrator;
a drive circuit that supplies drive power which drives the piezoelectric vibrator;
a resistor section that has a resistance value that is variable, and is connected in parallel with the piezoelectric vibrator, wherein
the resistor section includes:
a resistor connected in parallel with the piezoelectric vibrator;
a first coil connected in parallel with the piezoelectric vibrator;
a second coil magnetically coupled to the first coil; and
resistors connected via a switch between respective ends of the second coil and a ground part, and
the apparatus further comprises a delay circuit that delays at least one of a changeover of the switch from an open state to a closed state and a changeover of the switch from the closed state to the open state.

2. The object detection apparatus according to claim 1, further comprising a control section that variably controls the resistance value.

3. The object detection apparatus according to claim 2, wherein the control section makes the resistance value smaller, during a time period in which reverberation is produced in the piezoelectric vibrator after the drive power is supplied, than the resistance value during standby for receiving the reflected wave.

4. The object detection apparatus according to claim 3, wherein if a wave height of the ultrasonic wave becomes smaller than a predetermined value after the drive power is supplied, the control section increases the resistance value.

5. The object detection apparatus according to claim 2, wherein the control section makes the resistance value during supplying of the drive power greater than the resistance value following the supplying of the drive power.

6. The object detection apparatus according to claim 1, wherein
the switch is connected to the resistor at a side of the second coil and at a first connection point, and
the delay circuit comprises:
an auxiliary switch which opens and closes between a conduction control terminal of the switch and the ground part;
a fourth resistor which connects the first connection point and a second connection point, which is a connection point of the auxiliary switch and the conduction control terminal of the switch; and
a capacitor which connects the second connection point and the ground part.

7. The object detection apparatus according to claim 1, wherein the drive circuit supplies power to the piezoelectric vibrator via the first coil and the second coil.

8. The object detection apparatus according to claim 1, wherein the resistor section includes a series-connected body which is formed of a resistor and a switch.

9. An object detection apparatus that drives a piezoelectric vibrator to transmit an ultrasonic wave, and receives a reflected wave that is reflected from an object, the apparatus comprising:
the piezoelectric vibrator;
a drive circuit that supplies drive power which drives the piezoelectric vibrator;
a resistor section that has a resistance value that is variable, and is connected in parallel with the piezoelectric vibrator; and
a control section that variably controls the resistance value,
wherein the control section performs control in a first mode and control in a second mode, in which the ultrasonic wave is transmitted with the resistance value different between the first mode and the second mode.

10. The object detection apparatus according to claim 9, wherein the control section makes the resistance value greater in the first mode than in the second mode, and based on, during the control in the first mode, the distance to the object that is acquired by receiving the reflected wave becoming less than a predetermined value, the control section performs the control in the second mode.

11. The object detection apparatus according to claim 9, wherein the control section alternately performs the control in the first mode and the control in the second mode.

12. The object detection apparatus according to claim 9, wherein the control section sets the resistance value in the first mode greater than the resistance value in the second mode, and makes a time period of supplying the drive power from the drive circuit in the first mode shorter than that in the second mode.

\* \* \* \* \*